United States Patent
Oota et al.

(10) Patent No.: US 7,388,711 B2
(45) Date of Patent: Jun. 17, 2008

(54) CONTROLLING APPARATUS FOR OPTICAL AMPLIFIER AND CONTROLLING METHOD THEREOF

(75) Inventors: Masato Oota, Kawasaki (JP);
Nobukazu Koizumi, Kawasaki (JP);
Yohei Koganei, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/605,275

(22) Filed: Nov. 29, 2006

(65) Prior Publication Data
US 2007/0070492 A1   Mar. 29, 2007

Related U.S. Application Data

(60) Division of application No. 11/008,963, filed on Dec. 13, 2004, now Pat. No. 7,158,290, which is a continuation of application No. PCT/JP02/11447, filed on Nov. 1, 2002.

(51) Int. Cl.
*H01S 4/00* (2006.01)

(52) U.S. Cl. .................... 359/341.3; 359/341.41

(58) Field of Classification Search .......... 359/341.41, 359/341.3
See application file for complete search history.

(56) References Cited

U.S. PATENT DOCUMENTS

| | | | |
|---|---|---|---|
| 5,510,926 A | | 4/1996 | Bayart et al. |
| 5,664,131 A | * | 9/1997 | Sugiya ................. 359/337.13 |
| 6,025,947 A | | 2/2000 | Sugaya et al. |
| 6,377,394 B1 | * | 4/2002 | Drake et al. ........... 359/341.41 |
| 6,411,430 B1 | * | 6/2002 | Ogino et al. .......... 359/337.11 |
| 6,522,460 B2 | | 2/2003 | Bonnedal et al. |
| 6,542,291 B1 | * | 4/2003 | Kinoshita et al. ..... 359/341.33 |
| 6,621,621 B1 | | 9/2003 | Jones et al. |
| 6,683,713 B2 | * | 1/2004 | Irie ........................ 359/341.41 |
| 6,975,449 B1 | * | 12/2005 | Mok et al. ............. 359/341.41 |

(Continued)

FOREIGN PATENT DOCUMENTS

EP   0805571 A2   11/1997

(Continued)

OTHER PUBLICATIONS

Lelic, et al. "Smart EDFA with Embedded Control", The 14th Annual Meeting of IEEE Lasers & Electro-Optics Society (LEOS 2001), Conference Proceedings, 2001, vol. 2, Nov. 2001, pp. 419-420.

(Continued)

*Primary Examiner*—Jack W. Keith
*Assistant Examiner*—Eric Bolda
(74) *Attorney, Agent, or Firm*—Staas & Halsey LLP

(57) ABSTRACT

An optical amplifier is provided with a controlling unit for controlling a gain of the optical amplifier based on input light power and output light power of the optical amplifier, as well as a gain control amount variable unit for changing the gain control amount of the optical amplifier by the controlling unit according to at least one of the input light power and the output light power. Thereby, optical communication, which can follow the change in the input power of the optical amplifier in high speed and also is stable, can be realized, without causing the occurrence of an oscillation phenomenon, the large size of the optical amplifier, and the increase in power consumption and heating.

9 Claims, 14 Drawing Sheets

U.S. PATENT DOCUMENTS

| | | | |
|---|---|---|---|
| 6,989,923 B2* | 1/2006 | Stentz | 359/341.41 |
| 7,088,496 B2* | 8/2006 | Rapp | 359/337 |
| 2003/0030894 A1 | 2/2003 | Stentz | |
| 2004/0021932 A1 | 2/2004 | Maurer et al. | |
| 2004/0095636 A1* | 5/2004 | Pavel et al. | 359/341.41 |
| 2005/0157380 A1 | 7/2005 | Hatae et al. | |

FOREIGN PATENT DOCUMENTS

| | | |
|---|---|---|
| EP | 1079481 A2 | 2/2001 |
| EP | 1220382 | 7/2002 |
| JP | 7-221737 | 8/1995 |
| JP | 9-200145 | 7/1997 |
| JP | 2000-223764 | 8/2000 |
| JP | 2000-286491 | 10/2000 |
| JP | 2002-76486 | 3/2002 |
| JP | 2002-261364 | 9/2002 |
| WO | WO 00/38318 | 6/2000 |

OTHER PUBLICATIONS

K. Motoshima, et al., "A Channel-Number Insensitive Erbium-Doped Fiber Amplifier with Automatic Gain and Power Regulation Function", Journal of Lightwave Technology, vol. 19, No. 11, Nov. 2001, pp. 1759-1767.

* cited by examiner

FIG. B

CONTROLLING APPARATUS FOR OPTICAL AMPLIFIER AND CONTROLLING METHOD THEREOF

CROSS-REFERENCE TO RELATED APPLICATIONS

This application is a divisional of Ser. No. 11/008,963 filed Dec. 13, 2004, now U.S. Pat. No. 7,158,290 which is a continuation of PCT/JP2002/011447 filed on Nov. 1, 2002 in Japan, the disclosure of which is incorporated here in by reference.

BACKGROUND OF THE INVENTION

1. Field of the Invention

The present invention relates to a controlling apparatus for an optical amplifier and a controlling method therefor, to be used in an optical communication system, such as a WDM (wavelength division multiplexing) transmission system.

2. Description of the Related Art

In the optical communication system, as is well known, long distance transmission has been realized by providing one or more of optical amplifiers located in each predetermined interval. For example, on a transmission line crossing the Pacific Ocean, tens to hundreds optical amplifiers have been disposed. Some optical amplifiers use an optical fiber, in which rare earth ions, such as Er (erbium) ions, Pr (praseodymium) ions, and Tm (thulium) are doped, as an amplification medium, wherein among them, as compared with others, there has been used frequently an EDF (erbium doped fiber) optical fiber, in which the erbium ions are doped, whereby high output power, a high gain, and a broad band can be obtained.

On the other hand, the amount of information, to be transmitted via networks, has been increasing rapidly, according to the popularization of the Internet, and a larger capacity of the transmission system has been required. And as one of the technologies to realize the larger capacity of the transmission system, the WDM transmission system has been already put into practice.

At this WDM transmission system, there is multiplexed a plurality of signal light (channels) whose wavelengths are different from one another, whereupon the multiplexed signal light is transmitted via one optical transmission line (optical fiber). Therefore, it is required for the optical amplifier being used in the WDM transmission system to be able to amplify a plurality of signal light all together.

And recently, in order to realize a more flexible network structure, an OADM (optical add-drop multiplex) apparatus that can add or drop each signal light (channel) individually has been put into practice, and the signal light power to be transmitted via the optical transmission line does not become constant. As mentioned above, when the signal light power has fluctuated due to the change in the number of channels, (this change naturally occurs also in case of some trouble having occurred at a part of the channels), signal light of other channels cannot be received and demodulated correctly.

Therefore, at a conventional optical communication system, even in the case where the number of signal wavelengths of the WDM signal has changed, there is carried out control such that the output power of each signal wavelength is kept constant, by controlling the amplification gain at the optical amplifier to be constant. This controlling method is referred to as AGC (automatic gain control).

Concretely, the output light power of the optical amplifier is monitored, and the amplification gain (actually, for example, pumping light power) of the optical amplifier is controlled to be constant, based on the monitored value.

However, since at the above-mentioned conventional controlling method (AGC), time of approximately several 10 ms is required from the time of change in the input light power up to the achievement of a suitable control, with the result that this required time places a limit on increase and decrease in the signal light wavelengths. And in the event of some disconnection attributed to an accident having occurred, there would be exerted adverse influences on signal levels of other wavelengths for a long period of time.

Therefore, at the AGC of the optical amplifier, it is desirable that the output light power is controlled to be constant in a short time by high speed-response to the change of the input light power in high speed. However, if the response speed of the AGC should be made high to a great extent without any limit, there is fear of occurrence of an oscillation phenomenon.

Therefore, as the high speed method at the AGC, conventionally, for example, there are technologies proposed by Japanese Patent Laid-Open (Kokai) HEI 9-200145 (hereinafter, referred to as Patent Document 1) and Japanese Patent Laid-Open (Kokai) HEI 7-221737 (hereinafter, referred to as Patent Document 2).

That is, first, the technology described in the Patent Document 1 has a structure in which signal light to be amplified is inputted to an optical amplifier (EDF) via an optical fiber having a predetermined delay time, and the supply of pumping light is started in a period between the time when the reach of the signal light at the input terminal of the optical fiber has been detected and the time when the signal light reaches the EDF (for example, refer to paragraphs [0034] to [0039] of the Patent Document 1). Thereby, it becomes possible that time requiring for pumping light control has a margin of above-mentioned delay time, and as a result, it becomes possible that the occurrence of optical surge is restrained and also the response speed of the AGC is enhanced.

On the other hand, at the technology described in the Patent Document 2, adjusting light for canceling the change in input signal light is inputted in an optical amplifier from the reverse direction with respect to the transmitting direction of the signal light, and output constant control of the optical amplifier is carried out by controlling pumping light of the optical amplifier response to the adjusting light. By this method, the range of input light power to be controlled in the optical amplifier can be made narrow, so that the response speed of the AGC can be enhanced easily (for example, refer to paragraphs [0016] to [0027] of the Patent Document 2).

However, at the technology described in the Patent Document 1, the optical fiber for delaying the signal light inputting in the optical amplifier delay is additionally disposed, thus resulting in the deterioration of characteristics and the large size of the optical amplifier due to this additional optical fiber. And at the technology described in the Patent Document 2, high speed control of the adjusting light is required, and this results in the increase of the power consumption and the heating of the optical amplifier by the adjusting light output.

It is therefore an object of the present invention to provide a controlling apparatus for an optical amplifier and a controlling method therefor, which can carry out a follow-up control with high speed response characteristic in response to the change in input power of signal light without the occurrence of the oscillation phenomenon, the larger size of the optical amplifier, and the increase of the power consumption and the heating.

SUMMARY OF THE INVENTION

For achieving the above-mentioned object, a controlling apparatus for an optical amplifier and a controlling method therefor of the present invention are characterized that the present invention comprises the following means.

(1) a first controlling means for controlling a gain of an optical amplifier based on input light power and output light power of the optical amplifier, and (2) a gain control amount variable means for making a gain control amount of the optical amplifier by the first controlling means change, according to at least either one of the input light power and the output light power.

Here, the first controlling means may comprise a gain control amount operator which calculates a difference from a target gain of the optical amplifier based on the input light power and the output light power, and calculates the gain control amount based on the difference, and the gain control amount variable means may comprise a coefficient controller which changes a coefficient for the difference according to at least either one of the input light power and the output light power.

And the first controlling means may comprise a gain control amount operator which calculates a difference from a target gain of the optical amplifier based on the input light power and the output light power, and calculates the gain control amount based on the difference and an integration value of the difference, and the gain control amount variable means may comprise a coefficient controller which changes a coefficient for the difference according to at least either one of the input light power and the output light power.

Further, the first controlling means may comprise a gain control amount operator which calculates a difference from a target gain of the optical amplifier based on the input light power and the output light power, and calculates the gain control amount based on the difference and an integration value of the difference, and the gain control amount variable means may comprise a coefficient controller which changes a coefficient for the difference and a coefficient for the integration value respectively according to at least either one of the input light power and the output light power.

And the controlling apparatus for the optical amplifier according to the present invention may further comprise a second controlling means for executing feed forward control for a gain of the optical amplifier based on the input light power, and the gain of the optical amplifier can be controlled by the combination of the first controlling means and the second controlling means.

Further, in a case where the optical amplifier is provided with a first pumping light source and a second pumping light source, the first controlling means may comprise an insufficient amount deciding section which calculates, in a case where expected pumping light power is not able to be obtained by the first pumping light source, a gain control amount which is necessary to compensate for an insufficient amount, by the second pumping light source, and a converting section which carries out a conversion for the gain control amount calculated by the insufficient amount deciding section in such a manner that the coefficient for the difference is kept constant regardless of whether the expected pumping light power of the first pumping light source is sufficient or insufficient.

And a controlling apparatus for an optical amplifier according to the present invention is a controlling apparatus for an optical amplifier having a first pumping light source and a second pumping light source is characterized in a manner that the controlling apparatus for the optical amplifier comprises a controlling means for calculating a difference from a target gain of the optical amplifier based on input light power and output light power of the optical amplifier and for controlling the gain of the optical amplifier based on the difference, and this controlling means comprises an insufficient amount deciding section which calculates, in a case where expected pumping light power is not able to be obtained by the first pumping light source, a gain control amount which is necessary to compensate for an insufficient amount, by the second pumping light source, and a converting section which carries out a conversion for the gain control amount calculated by the insufficient amount deciding section in such a manner that the coefficient for the difference is kept constant regardless of whether the expected pumping light power of the first pumping light source is sufficient or insufficient.

Further, a controlling method for an optical amplifier comprises the steps of (1) calculating a gain control amount for controlling a gain of the optical amplifier based on input light power and output light power of the optical amplifier, and (2) changing the calculated gain control amount according to at least either one of the input light power and the output light power.

And a controlling method for an optical amplifier is a controlling method for an optical amplifier having a first pumping light source and a second pumping light source, comprising the steps of, when a difference from a target gain of the optical amplifier is obtained based on input light power and output light power of the optical amplifier, and the gain of the optical amplifier is controlled based on the difference, and (1) when expected pumping light power is not able to be obtained at the first pumping light source, calculating a gain control amount to compensate for an insufficient amount, by the second pumping light source, and (2) carrying out a conversion for the gain control amount in such a manner that the coefficient for the difference is kept constant regardless of whether the expected pumping light power of the first pumping light source is sufficient or insufficient.

BRIEF DESCRIPTION OF THE DRAWINGS

FIG. 13 is a block diagram showing a modification of the control section shown in

FIG. 11;

DETAILED DESCRIPTION OF THE PREFERRED EMBODIMENTS

[A] Description of First Embodiment

Figure 1:
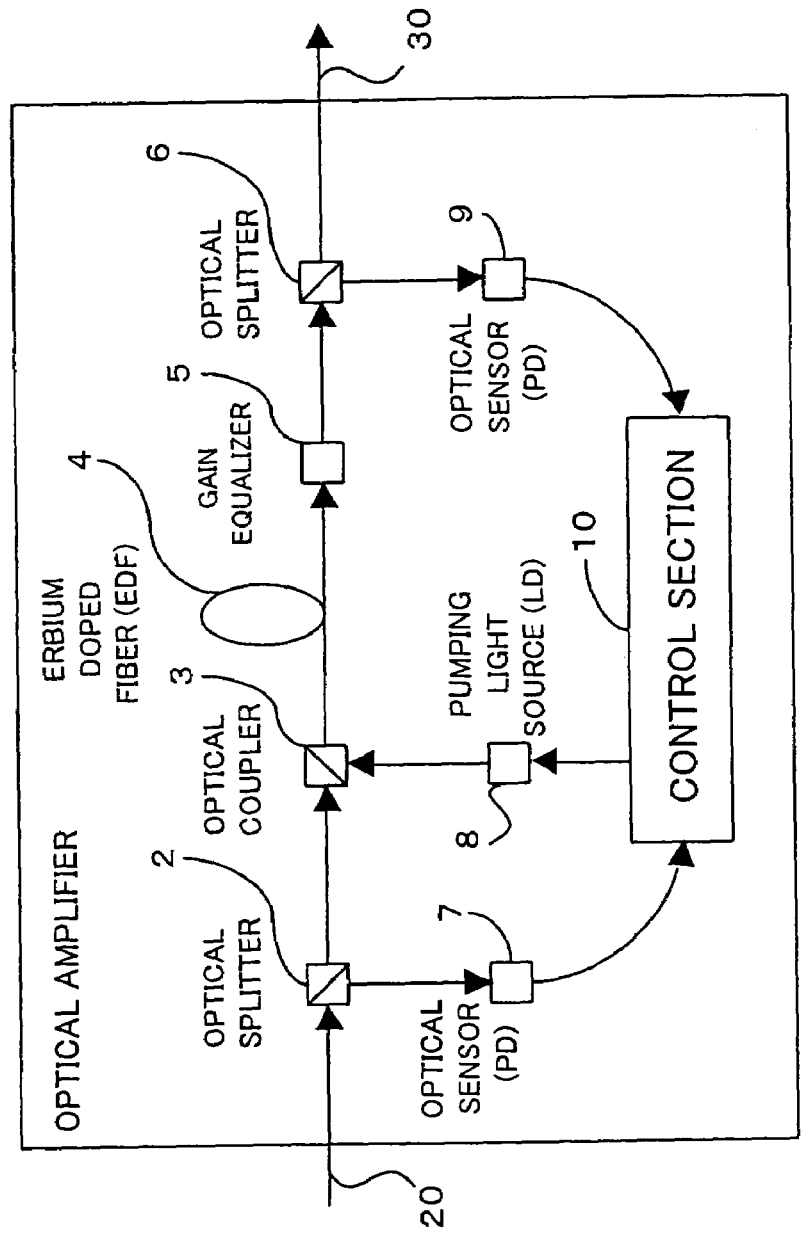
FIG. 1 is a block diagram showing a structure of main parts of an optical amplifier according to a first embodiment of the present invention.

FIG. 1 is a block diagram showing a structure of main parts of an optical amplifier according to a first embodiment of the present invention. An optical amplifier 1 shown in FIG. 1 has a structure that is provided with optical splitters 2 and 6, an optical coupler 3, an EDF (erbium doped optical fiber) 4, a gain equalizer 5, optical sensors 7 and 9, a pumping light source 8, and a control section 10.

The optical splitter 2 splits a part of WDM signal light (main signal light) received from an optical transmission line 20 and outputs one of the split WDM signal light to the side of the EDF 4, and also outputs the other of the split WDM signal light to the optical sensor 7 as monitoring light for monitoring the power, and the optical coupler 3 couples pumping light supplied from the pumping light source 8 with the main signal light from the optical splitter 2.

And the EDF 4 amplifies the main signal light from the optical coupler 3 by the pumping light, and the gain equalizer 5 equalizes the gain of the output amplified by the EDF 4, that is, equalizes (flattens) the gain of each wavelength of the main signal light. The optical splitter 6 splits a part of the output equalized by the gain equalizer 5 and outputs one component of the split output to an optical transmission line 30 of the output side, and also outputs the other component of the split output to the optical sensor 9 as monitoring light for monitoring the power.

On the other hand, the optical sensor 7 receives the monitoring light split at the optical splitter 2 and generates an electric signal according to the amount (power) of the received light, and similarly, the optical sensor 9 receives the monitoring light split at the optical splitter 6 and generates an electric signal according to the amount (power) of the received light, and each of them is composed of, for example, a PD (photodiode). That is, the optical sensor 7 functions as an input light measuring means that measures input light power to the EDF 4, which functions as an optical amplifier, and the optical sensor 9 functions as an output light measuring means that measures output light power from the EDF 4.

And the pumping light source 8 generates pumping light for the EDF 4, and is composed of, for example, an LD (laser diode).

And the control section 10 controls pumping light power of the pumping light source 8, based on the measured results of power (input light power and output light power) by the optical sensors 7 and 9, and carries out constant control (AGC: automatic gain control) over the gain of the EDF 4. At the first embodiment of the present invention, the pertinent invention has been devised so as to achieve the response speed of the AGC higher than in the conventional techniques, whereby the AGC can carry out a follow-up control in a high speed response sufficiently even when the input light power has changed rapidly.

Figure 2:
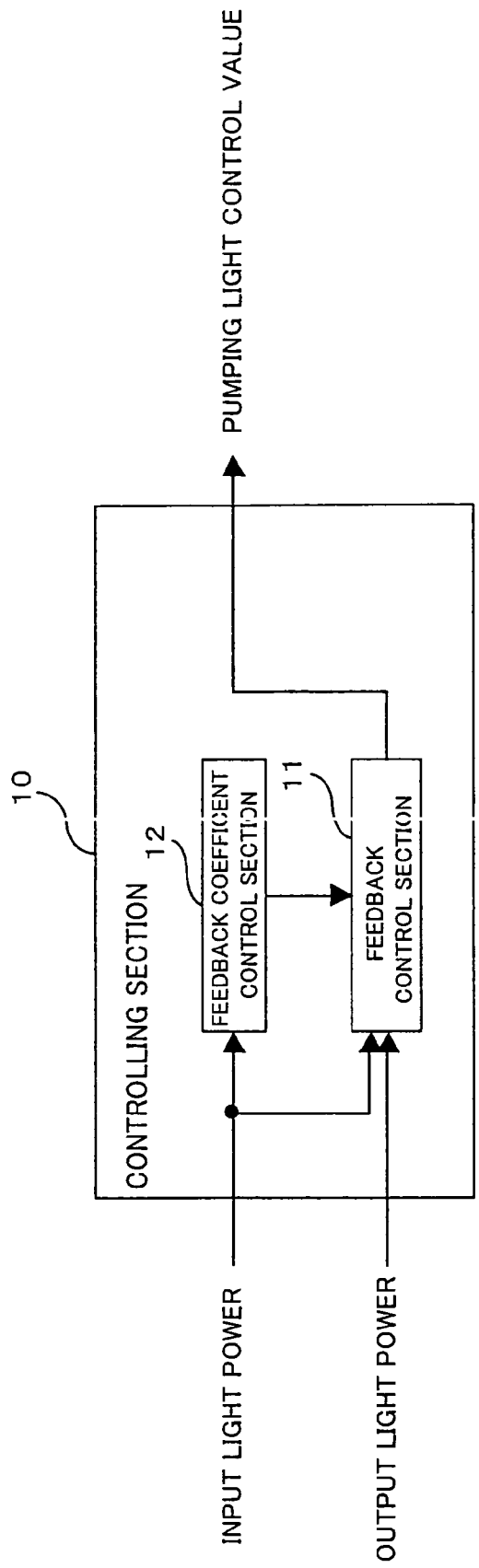
FIG. 2 is a block diagram showing a structure of a control section shown in FIG. 1.

Specifically, for example, as shown in FIG. 2, the control section 10 at the first embodiment has a structure that is provided with a feedback control section 11 and a feedback coefficient control section 12.

Figure 4:
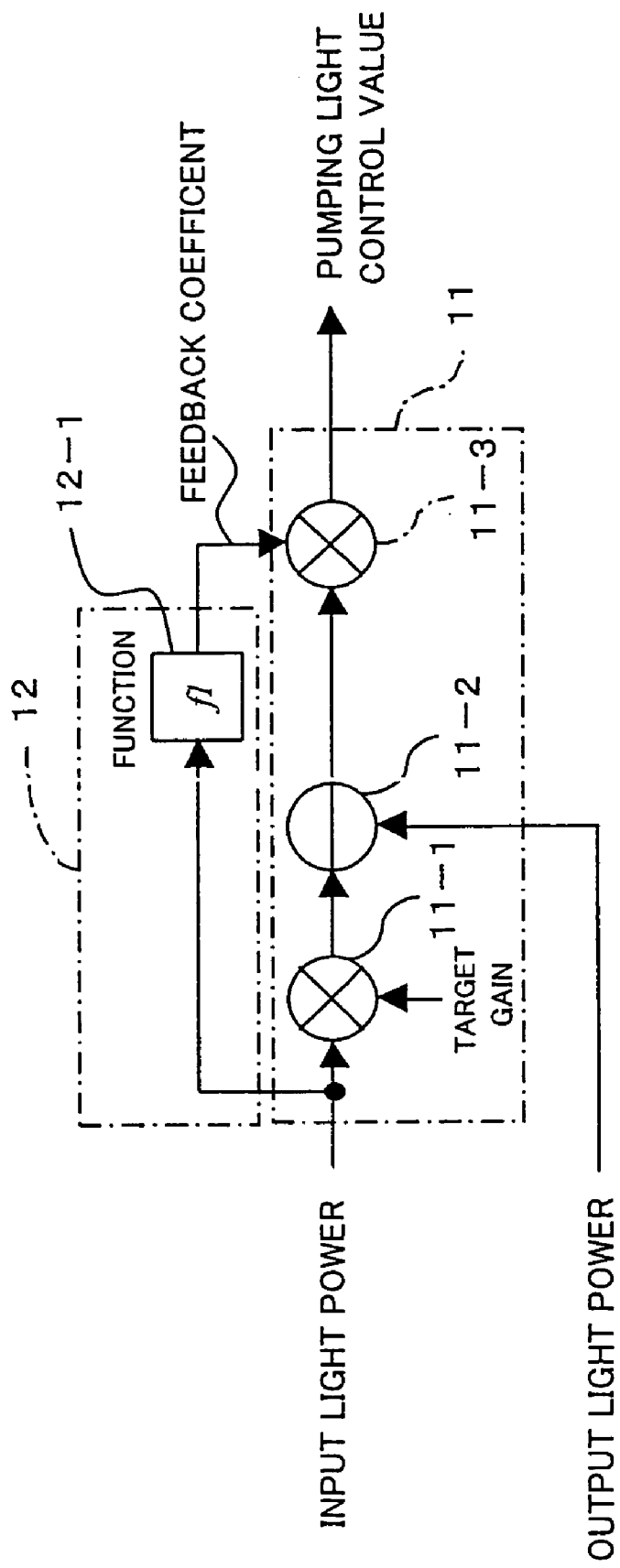
FIG. 4 is a block diagram showing structures of a feedback control section and a feedback coefficient control section shown in FIG. 2.

Herein, the feedback control section 11 (first controlling means) calculates a control amount at the time when feedback control is carried out over the gain (that is, pumping light power) of the EDF 4 based on the input light power and the output light power monitored at the optical sensors 7 and 9 respectively, and actually, the control amount is calculated by, for example, the following equation (1).

$$LD_{out} = a \times (P_{in} \times G - P_{out}) \quad (1)$$

where, $LD_{out}$: pumping light power
$P_{in}$: input light power
$P_{out}$: output light power
G: target gain Therefore, for example, as shown in FIG. 4, the feedback control section 11 has a structure that is provided with a multiplier 11-1 that multiplies the input light power $P_{in}$ by the target gain G, a subtractor 11-2 that calculates the difference by subtracting the output light power $P_{out}$ from the multiplied result, and a multiplier 11-3 that calculates a pumping light control value by multiplying the calculated difference by a feedback coefficient "a".

That is, these multiplier 11-1, subtractor 11-2, and multiplier 11-3 work as a function being a gain control amount operator that calculates the difference from the target gain G of the optical amplifier 1 (input light power $P_{in}$×target gain G−output light power $P_{out}$) based on the input light power and the output light power of the optical amplifier 1, and calculates the gain control amount based on the difference.

Here, in order to carry out the feedback control having a high speed response characteristic, it is enough that the coefficient (feedback coefficient "a") in the equation (1) is made to have a large value, however, if this coefficient "a" should be made to have a large value without any limit, the output of the EDF 4 would be subjected to spurious or adverse oscillation and would not converge. Especially, at the EDF 4 that is frequently used as the optical amplifier, the oscillation is liable to occur due to its characteristics, and the feedback coefficient "a" cannot be a value large enough for the EDF 4 to be able to be follow-up controlled in response to the rapid change in the input light power.

Figure 3:
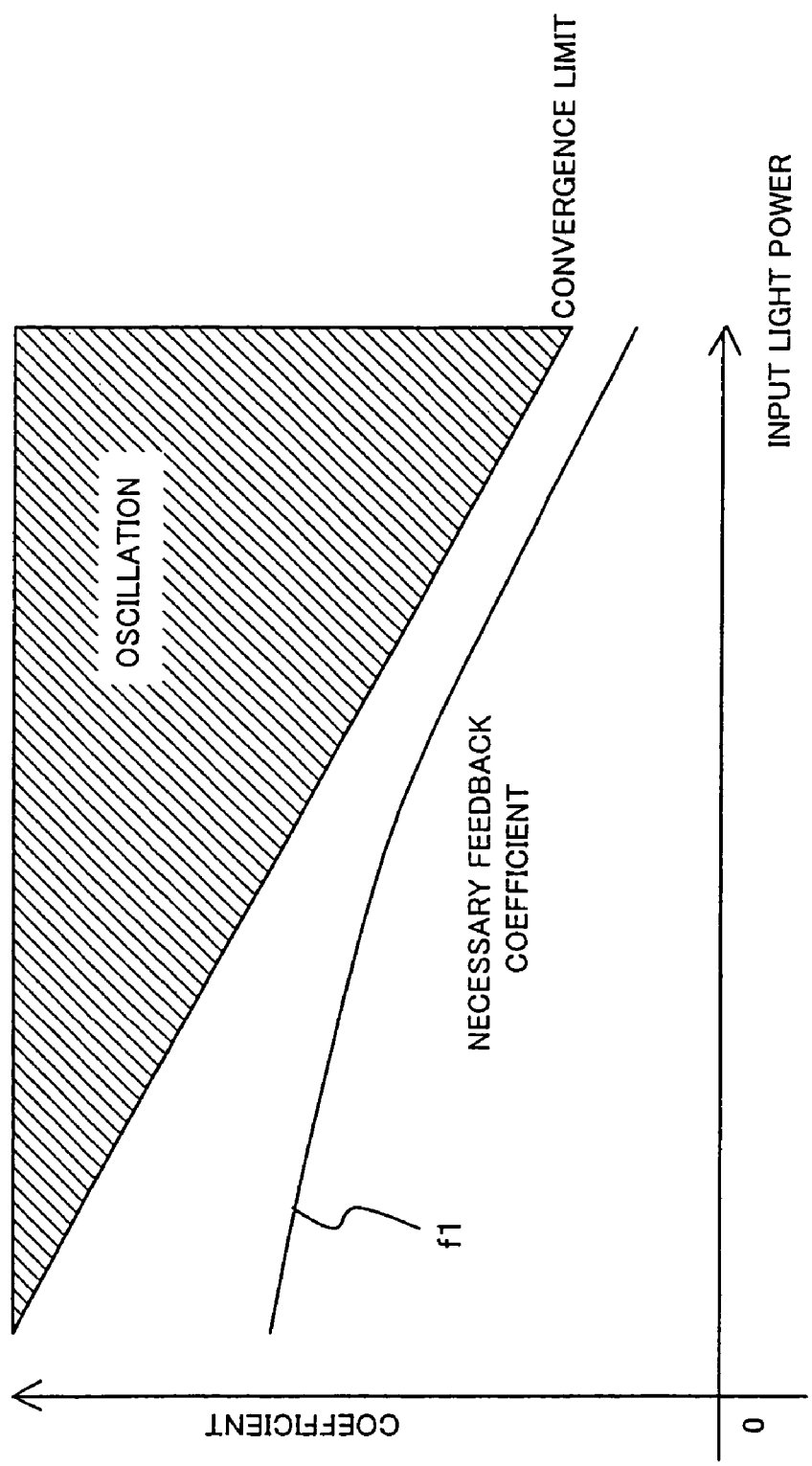
FIG. 3 is a diagram showing a relation between input light power and a necessary feedback coefficient according to embodiments of the present invention.

However, by considering the transient phenomenon of the EDF 4 involved in the change of the pumping light power, and by the fact that the feedback coefficient "a" is made to have a value according to the input light power, high speed follow-up control can be realized in a state that the oscillation does not occur. For example, in connection with the EDF 4, there is shown in FIG. 3 the relation between the input light power, and the coefficient "a" that leads to the oscillation state (convergence limit) and the coefficient "a" that enables to secure sufficient performance (high speed response performance). As shown in FIG. 3, it is apparent that there is exhibited a characteristic in the state being difficult of oscillating at a location where the coefficient "a" is necessary to be made large.

Therefore, at the first embodiment of the present invention, by the feedback coefficient control section 12 (gain control amount variable means) the feedback coefficient "a" is controlled (made variable) according to the input light power $P_{in}$ monitored at the optical sensor 7. Actually, as shown in FIG. 4, the feedback coefficient "a" is controlled by a function $f_1$ (function operator 12-1) of the necessary feedback coefficient "a" shown in FIG. 3.

Here, the function $f_1$ of the necessary feedback coefficient "a" shown in FIG. 3 can be represented by, for example, the following equation (2).

$$f_1 = b \times \text{convergence limit} \qquad (2)$$

In this equation (2), "b" is a constant being 0 or more and less than 1, and is determined depending upon what degree of the high speed response performance is required. And the "convergence limit" is described by the following equation (3), in the case where, for example, approximately 20 dB gain is given to the EDF 4.

$$\text{convergence limit} = c/P_{in} \qquad (3)$$

Therefore, the function $f_1$ can be described in the following equation (4).

$$f_1 = b \ c/P_{in} \qquad (4)$$

Here, in the equations (3) and (4), the "$P_{in}$" signifies the input light power, and "c" signifies a constant decided by the characteristic and the gain of the EDF. Incidentally in the case where the input light power is small, when the equation (4) is used as it is, the feedback coefficient "a" becomes a large value, and the response becomes too fast or too high speed and the operation circuit becomes complicated, so that, at a location where the input light power is small, it is sometimes desirable that the feedback coefficient "a" is made to have a constant or the value of "b" is changed.

And in the case where each of the control sections 11 and 12 is implemented by a small logic circuit, it is difficult to realize the division of the function $f_1$, however, for example, when the function $f_1$ is stored in a memory, such as a RAM as data of a table form, this is to be realized.

By the structure, at the optical amplifier 1 of the first embodiment, each of the input light power $P_{in}$ and the output light power $P_{out}$ of the optical amplifier 1 (EDF 4) is measured at each of the respective optical sensors 7 and 9, and at the feedback control section 11, the difference from the target gain G (input light power $P_{in} \times$ target gain G– output light power $P_{out}$) is calculated by the subtractor 11-2 based on the measured input light power $P_{in}$ and the measured output light power $P_{out}$, whereupon the pumping light control value is calculated by multiplying the calculated difference by the feedback coefficient "a" at the multiplier 11-3.

And at this time, the feedback coefficient "a" is made variable by the feedback coefficient control section 12 (function $f_1$) according to the input light power $P_{in}$, and becomes a necessary and sufficient value at the "conver- gence limit" or less, and the AGC of the EDF 4 can be carried out in high speed without the occurrence of the oscillation phenomenon. In particular, at the embodiment of the present invention, since feed forward control by a feed forward control section 13 is carried out together with the feedback control, the AGC having faster speed can be realized. The feed forward control will be explained later in detail.

Therefore, in response to the change of the input power of the signal light to the optical amplifier 1 being used in the WDM transmission system, without any occurrence of the oscillation phenomenon, the large size of the optical amplifier, and the increase of the power consumption and the heating, the AGC can carry out follow-up control in high speed and the change of the output power of the optical amplifier 1 can be restrained. Actually, when the number of wavelengths (channels) in use as the signal light has changed, the change in the output power of each signal light can be made smaller. As a result, a WDM optical communication being more stable than a conventional one can be realized.

(A1) Description of First Modification of First Embodiment

Figure 5:
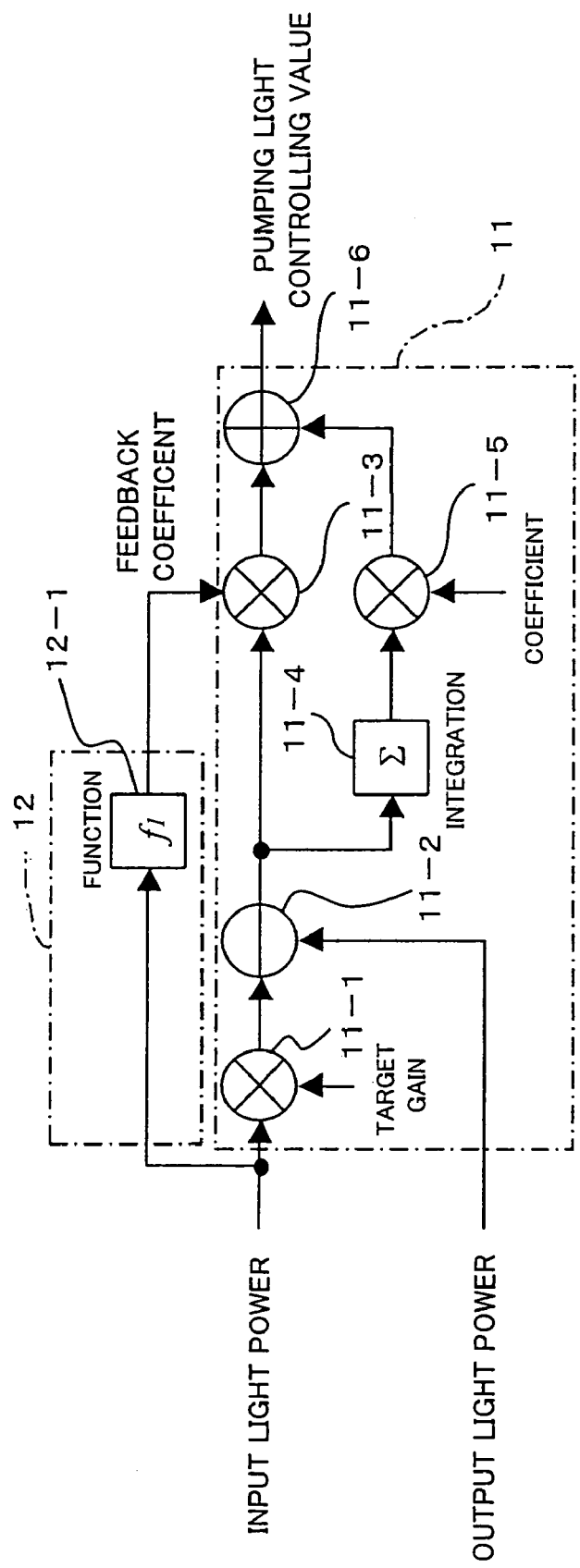
FIG. 5 is a block diagram showing a first modification of the feedback control section and the feedback coefficient control section shown in FIG. 4.

FIG. 5 is a block diagram showing a first modified example of the control section 10 (the feedback control section 11 and the feedback coefficient control section 12). The configuration shown in FIG. 5 is different, as compared with the structure shown in FIG. 4, in that the feedback control section 11 is further provided with an integrator 11-4, a multiplier 11-5, and an adder 11-6, in addition to the above-mentioned multipliers 11-1 and 11-3, and the subtractor 11-2. Here, other structural elements (that have the same reference number as the first embodiment has) are the same as those at the first embodiment or similar to those at the first embodiment unless they are explained, and this is also the case with the following modified examples.

Here, the integrator 11-4 integrates the difference calculated at the subtractor 11-2, the multiplier 11-5 multiplies the integration value of the difference calculated at the integrator 11-4 by a predetermined coefficient, and the adder 11-6 calculates the pumping light control value by adding the multiplied result at the multiplier 11-5 and the multiplied result at the multiplier 11-3.

That is, each of the constituent elements 11-1 to 11-6 of the feedback control section 11 of the first modified example functions as a gain control amount operator, which calculates the difference from the target gain G (input light power $P_{in} \times$ target gain G–output light power $P_{out}$) based on the input light power $P_{in}$ and the output light power $P_{out}$ of the optical amplifier 1 and calculates a gain control amount of the optical amplifier 1 based on the difference and the integration value of the difference.

By this structure, the same effect and operation as the first embodiment can be obtained, and a more stable AGC can be realized, compared with the first embodiment.

(A2) Description of Second Modification of First Embodiment

Figure 6:
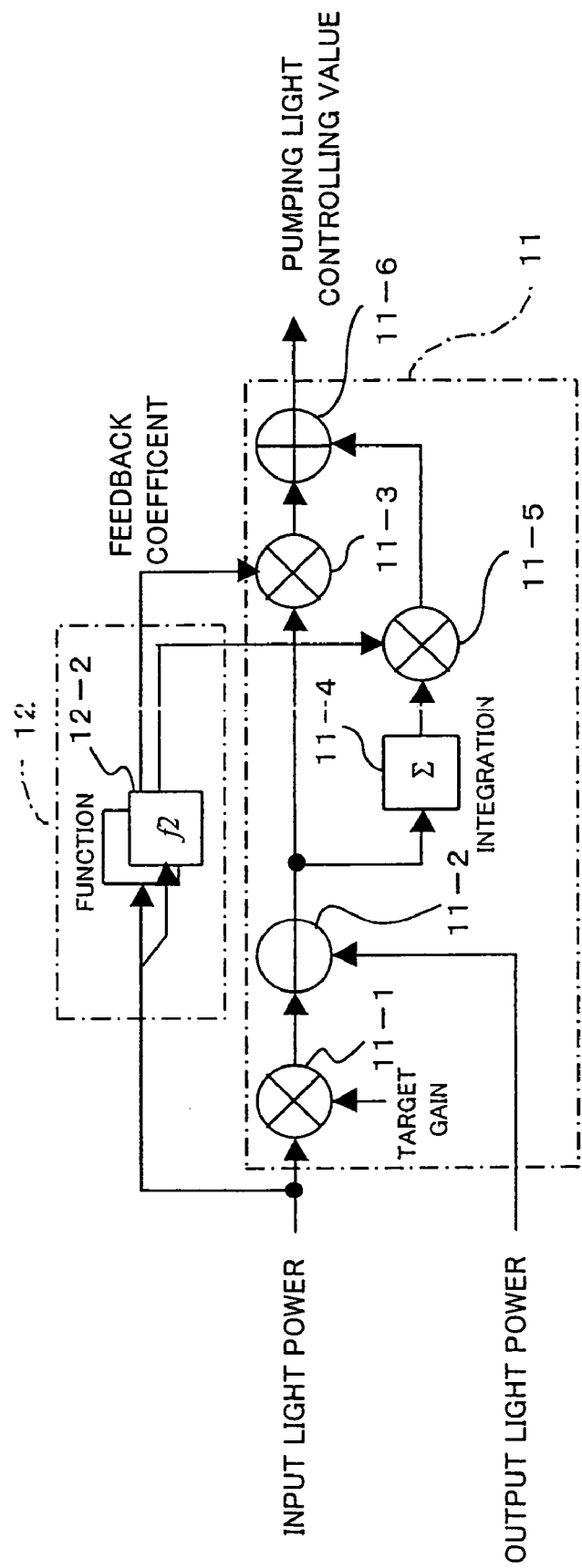
FIG. 6 is a block diagram showing a second modification of the feedback control section and the feedback coefficient control section shown in FIG. 4.

FIG. 6 is a block diagram showing a second modified example of the control section 10 (the feedback control section 11 and the feedback coefficient control section 12). In FIG. 6, compared with the structure shown in FIG. 5, the feedback coefficient control section 12 provided with a function $f_2$ (function operator 12-2), in addition to the above-mentioned function $f_1$ (function operator 12-1), and the output of the function $f_2$ is multiplied by the output of the integrator 11-4 at the multiplier 11-5 of the feedback control section 11. This is different from the first modified example.

Here, the above-mentioned function $f_2$ is a function whose value of "c" is different from the function $f_1$ (this is different depending on the characteristic and the gain of the EDF, and the amplification structure and the like). That is, in the second modification, at the feedback control section 11, the coefficient multiplying by not only the difference calculated at the subtractor 11-2 but also the integration value of the difference calculated at the integrator 11-4 is variable by the function $f_1$ according to the input light power $P_{in}$.

Therefore, also in this case, the same effect and operation as the first modification of the first embodiment can be obtained, and compared with that shown in FIG. 5, a faster and more stable AGC can be realized.

[B] Description of Second Embodiment

Figure 7:
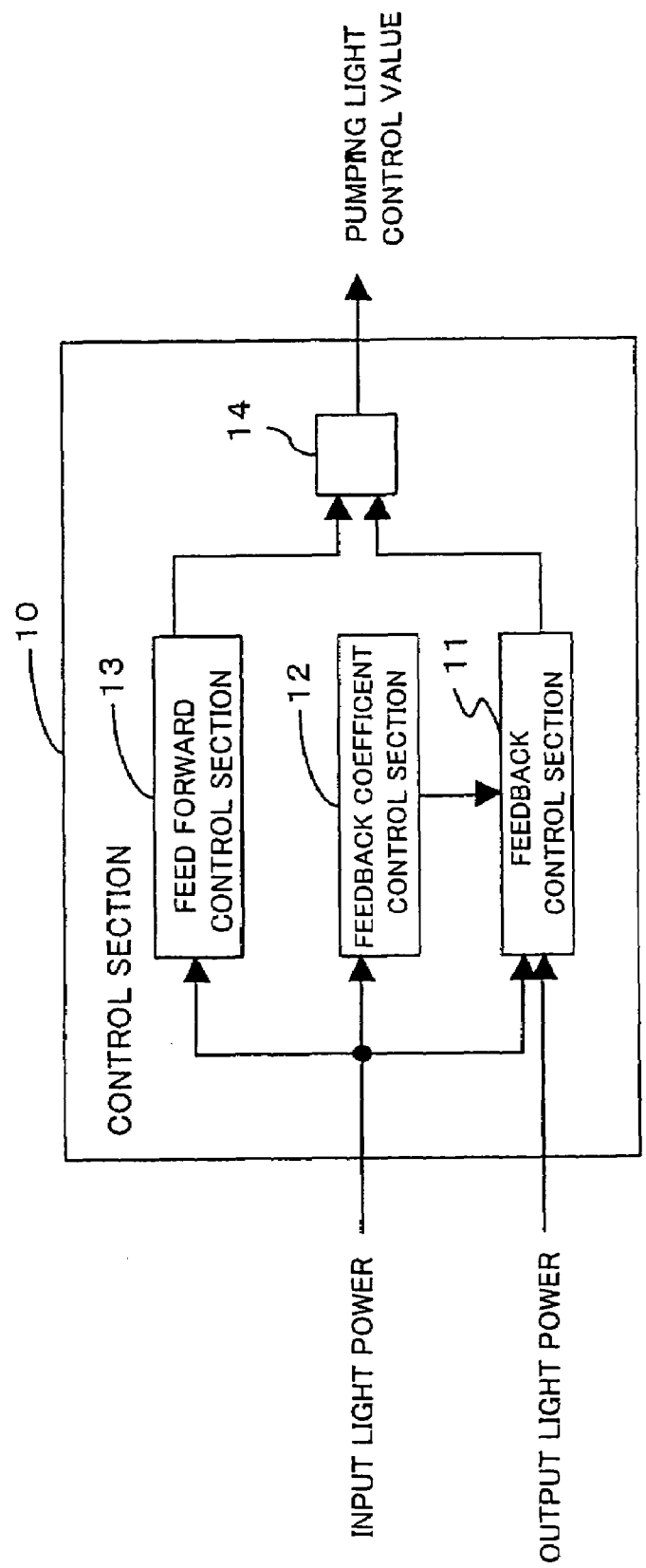
FIG. 7 is a block diagram showing a structure of a control section of an optical amplifier according to a second embodiment of the present invention.

FIG. 7 is a block diagram showing a structure of a control section of an optical amplifier according to a second embodiment of the present invention. A control section 10 shown in FIG. 7 further provided with a feed forward control section 13 and an adder 14, compared with that shown in FIG. 2. This is different from the first embodiment.

Here, the feed forward control section 13 (second controlling means) calculates a control amount (pumping light control value) when feed forward control is applied to pumping light power according to the input light power $P_{in}$ monitored at the optical sensor 7. The adder 14 adds the pumping light control value calculated at each of the control sections 11 and 13 and supplies it in the form of a pumping light control signal, to the pumping light source 8.

Figure 8:
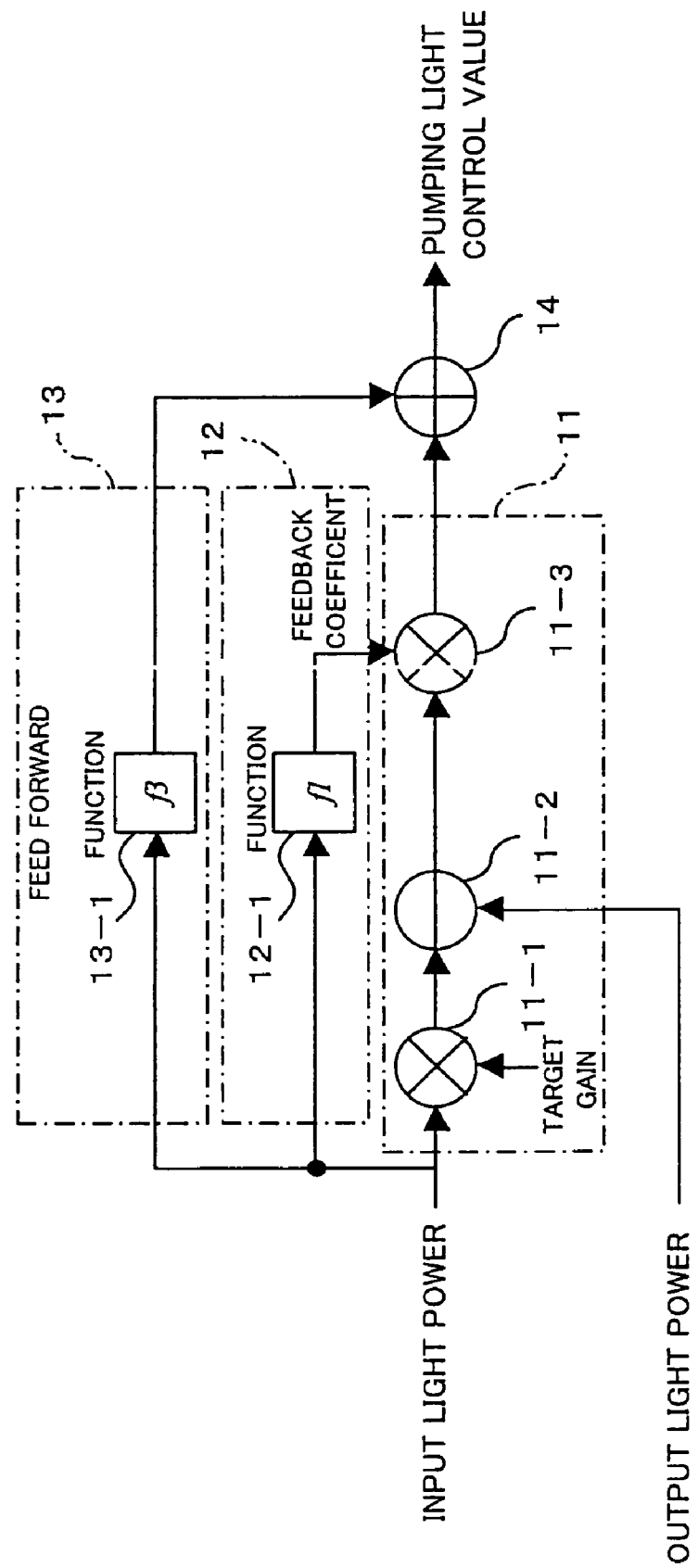
FIG. 8 is a block diagram showing structures of a feedback control section and a feedback coefficient control section and a feed forward control section shown in FIG. 7.

Actually, in this case, for example, as shown in FIG. 8, the feedback control section 11 has a structure that provided with multipliers 11-1 and 11-3 and a subtractor 11-2 being similar to those mentioned above, and the feedback coefficient control section 12 has a structure that provided with a function $f_1$ (function operator 12-1) being similar to that mentioned above, and the feed forward control section 13 has a structure that provided with a feed forward function $f_3$ (function operator 13-1). Here, the feed forward function $f_3$ can be a function that is used in existing feed forward control.

That is, the control section 10 of the second embodiment has a structure, in which the gain of the optical amplifier 1 is controlled by the combination of the feedback control section 11 and the feed forward control section 13. With this structure, the AGC of the optical amplifier 1 can be carried out in higher speed without the occurrence of the oscillation phenomenon, compared with the first embodiment.

Figure 9:
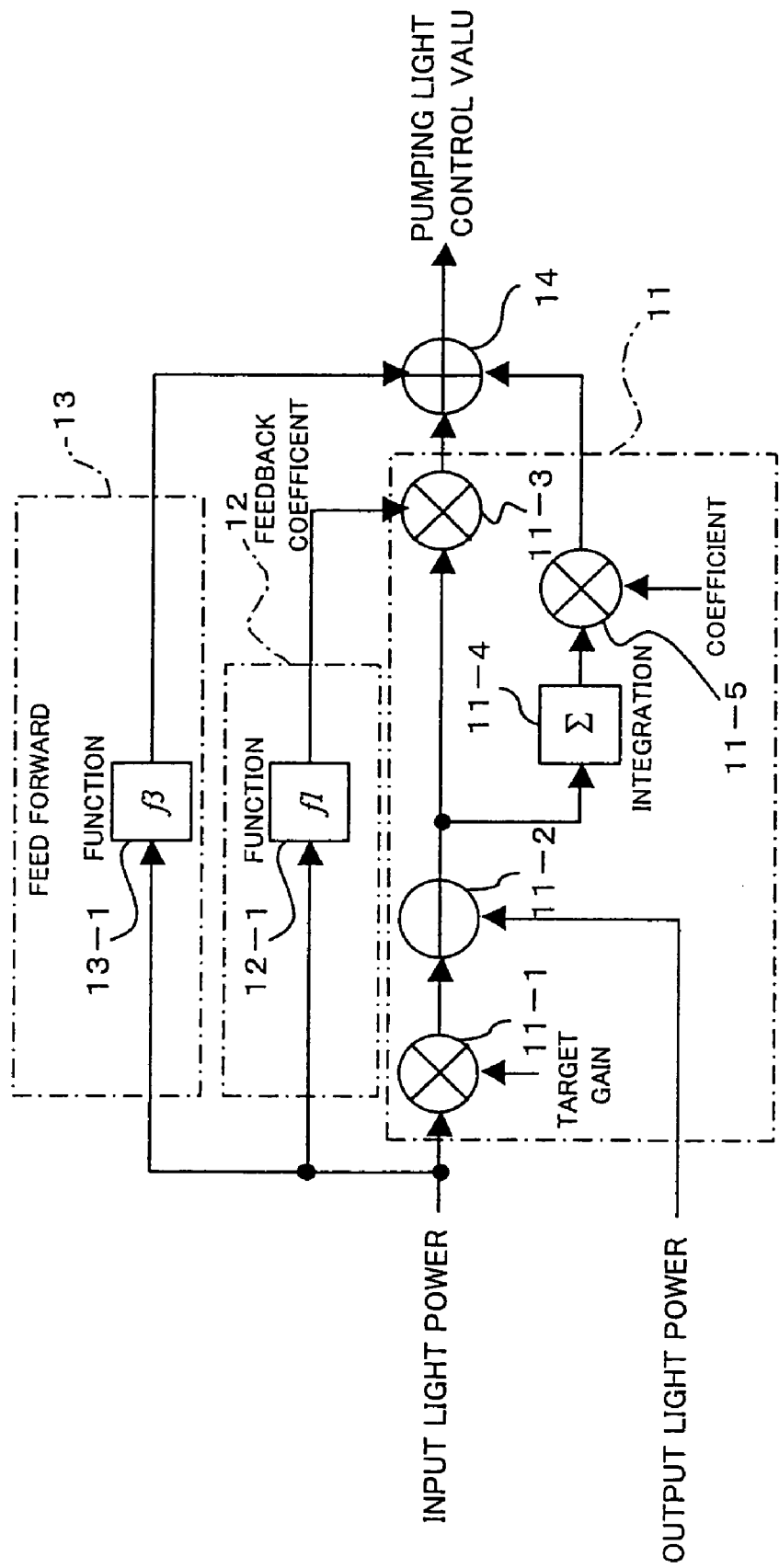
FIG. 9 is a block diagram showing a first modification of the feedback control section and the feedback coefficient control section and the feed forward control section shown in FIG. 8.
Figure 10:
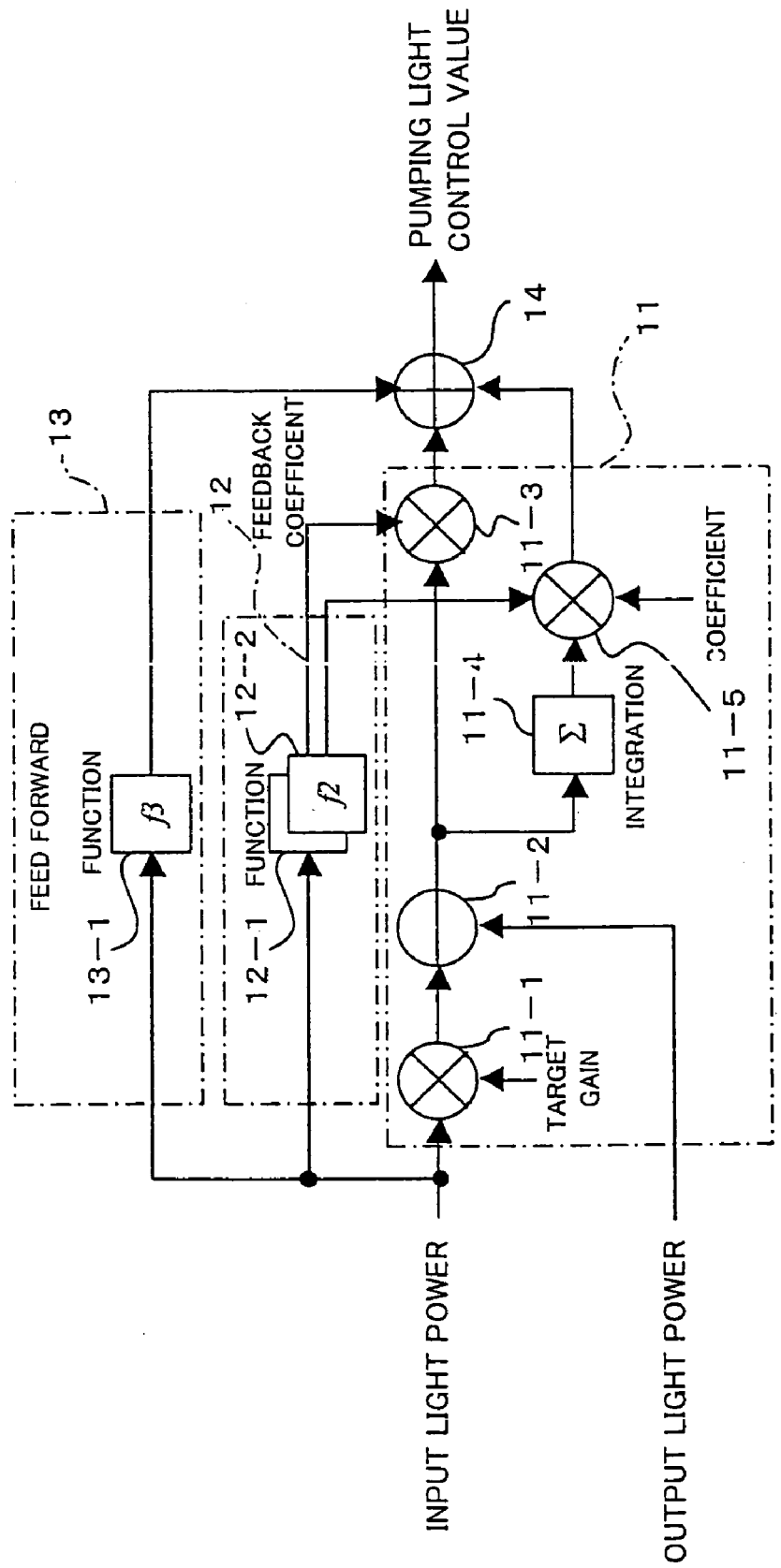
FIG. 10 is a block diagram showing a second modification of the feedback control section and the feedback coefficient control section and the feed forward control section shown in FIG. 8.

Here, in the case where the feed forward control section 13 is also used, similar to each of the structures shown in FIGS. 5 and 6, as shown in each of the structures shown in FIGS. 9 and 10, the feedback control section 11 can be configured such that the integration value of the difference calculated at the subtractor 11-2 is used for the feedback control, and also can be configured such that the coefficient being multiplied by the integration value is made variable by the function $f_2$ in this structure. In any one of the cases, the AGC of the optical amplifier 1 can be carried out in a more stable state and in high speed.

[C] Description of Third Embodiment

Figure 11:
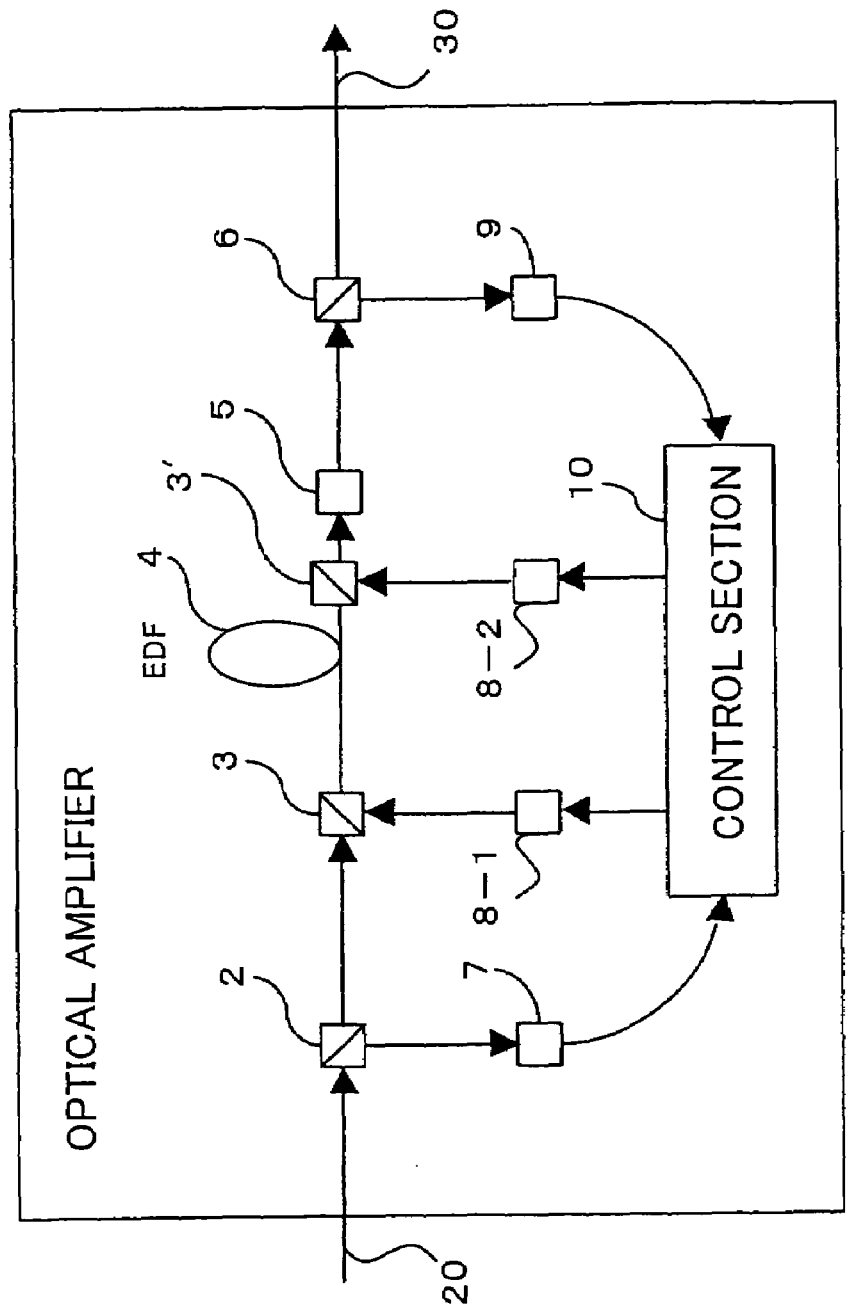
FIG. 11 is a block diagram showing a structure of main parts of an optical amplifier according to a third embodiment of the present invention.

FIG. 11 is a block diagram showing a structure of main parts of an optical amplifier according to a third embodiment of the present invention. An optical amplifier 1 shown in FIG. 11, compared with that shown in FIG. 1, provided with a plurality of pumping light sources (in this case, two) 8-1 and 8-2, and an optical coupler 3', which inputs pumping light generated at the pumping light source 8-2 in the EDF 4 from behind the EDF 4, and which is disposed between the EDF 4 and the gain equalizer 5. This is different from the first embodiment.

Figure 12:
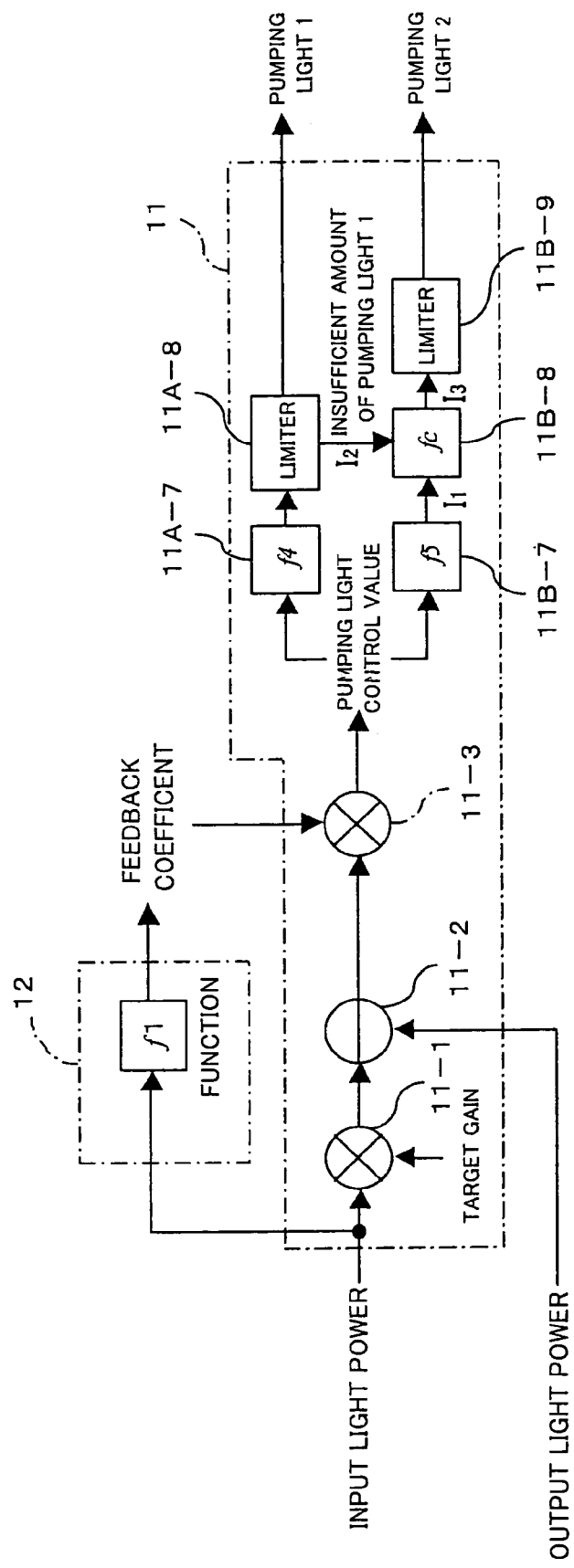
FIG. 12 is a block diagram showing a structure of a control section shown in FIG. 11.

And the control section 10 of this case also provided with a feedback control section 11 and a feedback coefficient control section 12 being similar to those shown in FIG. 2. However, in this case, for example, as shown in FIG. 12, the feedback control section 11 has a structure that provided with a function $f_4$ (current value operator 11A-7), a function $f_5$ (current value operator 11B-7), a function fc (conversion operator 11B-8), and limiters 11A-8 and 11B-9. Here, a multiplier 11-1, a subtractor 11-2, a multiplier 11-3, and a function $f_1$ are the same or similar to those mentioned above.

Here, the function $f_4$ (current value operator 11A-7) calculates a current value for driving the one (first) pumping light source 8-1 from the pumping light control value calculated, as mentioned above, at the multiplier 11-3, and the limiter 11A-8 limits the current value to a value within its allowable range (the maximum value or less) in the case where the current value calculated at the function $f_4$ exceeded the allowable range of the pumping light source 8-1.

However, at the third embodiment of the present invention, this limiter 11A-8, in the case where the current value calculated at the function $f_4$ has exceeded the allowable range, supplies a current value, which is obtained by subtracting the maximum value from a current value to be originally outputted, to the function fc (conversion operator 11B-8) as a current value (hereinafter, referred to as an insufficient current value) according to insufficient power of the pumping light power of the one pumping light source 8-1. That is, the limiter 11A-8 works as a function being an insufficient power deciding section that calculates a gain control amount, which is necessary to compensate for the insufficient power at the pumping light source 8-1, by the other pumping light source 8-2, when expected pumping light power cannot be obtained by the pumping light source 8-1.

Next, the above-mentioned function $f_5$ (current value operator 11B-7), similar to the function $f_4$, calculates a current value for driving the other pumping light source 8-2 from the above-mentioned pumping light control value. And the function fc (conversion operator (converting section) 11B-8) applies, by means of the current value calculated at the function $f_4$ and the insufficient current value supplied from the limiter 11A-8, when the insufficient power of the pumping light power by the one pumping light source 8-1 is compensated by the pumping light power of the other pumping light source 8-2, correction (conversion) to the insufficient current value such that the feedback coefficient "a" for both the pumping light sources 8-1 and 8-2 does not change.

Actually, the output (current value) $I_3$ of the function fc (conversion operator 11B-8) is described by, for example, the following equation (5), when it is assumed that the output of the function $f_5$ is $I_1$ and the insufficient current value is $I_2$.

$$fc = I_3 = I_1 + d \times I_2 \qquad (5)$$

In this equation (5), in the case where the insufficient current value is 0, the current value calculated at the function $f_5$ becomes the driving current value of the pumping light source 8-2 as it is, and in the cases except the above-mentioned case, a current value, obtained by the fact that the insufficient current value corrected such that the feedback coefficient "a" does not change is added to the current value calculated at the function $f_5$, becomes the driving current value of the pumping light source 8-2. The equation (5) signifies the above-mentioned cases. Here, the "d" in the equation (5) is selected such that the feedback coefficient "a" becomes the same at "the state 1" and "the state 2" in FIGS. 14 and 15 (this can be easily obtained by actual measurement). With this, the oscillation limit can be the same at "the state 1" and "the state 2".

Figure 14:
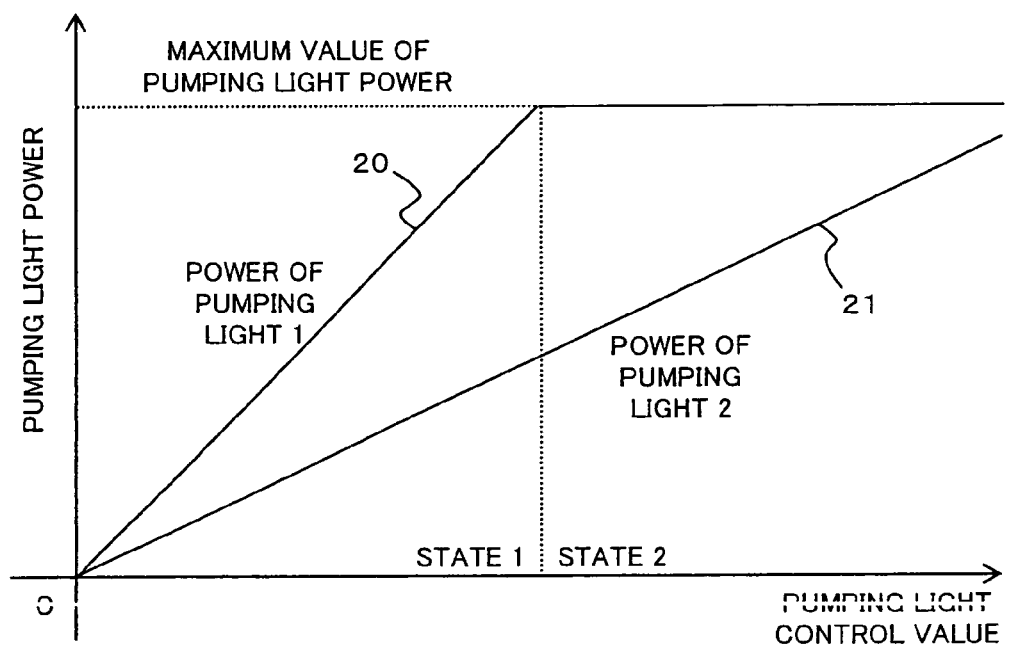
FIG. 14 is a diagram showing a relation between a pumping light control value and pumping light power for explaining pumping light power control (when correction is not carried out)
Figure 15:
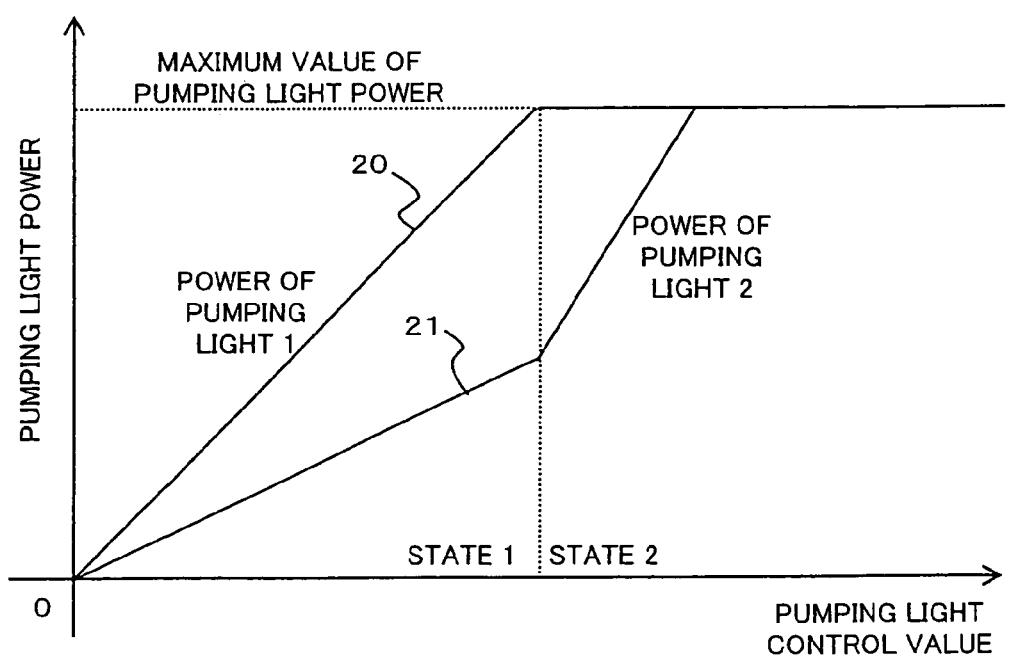
FIG. 15 is a diagram showing a relation between a pumping light control value and pumping light power for explaining pumping light power control by the control section shown in FIG. 12, when correction is carried out.

Here, FIG. 14 shows a relation between the pumping light control value (driving current value) and each pumping light power of the pumping light sources 8-1 and 8-2 when the correction by the function fc has not been carried out, and FIG. 15 shows a relation between the pumping light control value (driving current value) and each pumping light power of the pumping light sources 8-1 and 8-2 when the correction by the function fc has been carried out, in the case where the maximum output of each of the pumping light source 8-1 and the pumping light source 8-2 is the same and the output power (pumping light power) of the pumping light source 8-1 and the pumping light source 8-2 is controlled to become 2:1.

That is, in the case where the correction by the function fc has not been carried out, as shown in FIG. 14, at "the state 1", each pumping light power showing by continuous lines 20 and 21 proceeds to increase linearly according to the increase of the pumping light control value, however, at "the state 2", the pumping light power of the one pumping light source 8-1 showing by the continuous line 20 is kept in the maximum value by the limiter 11A-8, and the pumping light power of the other pumping light source 8-2 showing by the continuous line 21 proceeds to increase until the value reaches the maximum value in the same inclination at "the state 1".

On the other hand, in the case where the correction by the function fc has been carried out, as shown in the continuous line 21 of FIG. 15, at "the state 2", the pumping light power of the pumping light source 8-2 showing by the continuous line 21 proceeds to increase in the inclination being larger than that at "the state 1", and the insufficient pumping light power of the pumping light source 8-1 is compensated by the pumping light power of the pumping light source 8-2.

Here, the limiter 11B-9 shown in FIG. 12, similar to the limiter 11A-8, limits the current value to a value within its allowable range (the maximum value or less) in the case where the output (current value) of the function fc exceeded the allowable range of the pumping light source 8-2.

By the above-mentioned structure, at the control section 10 (the feedback control section 11) of the third embodiment, until the pumping light power of the pumping light source 8-1 reaches the maximum value (during the period of "the state 1" shown in FIG. 15), as shown in the continuous lines 20 and 21 of FIG. 15, the pumping light power of the pumping light sources 8-1 and 8-2 is controlled based on the pumping light control value (the output from the multiplier 11-3) calculated by using the feedback coefficient "a" that was made variable by the function $f_1$ according to the input light power.

On the other hand, after the pumping light power of the pumping light source 8-1 has reached the maximum value (during the period of "the state 2" shown in FIG. 15), the pumping light power of the pumping light source 8-1 is kept in the maximum value, and the insufficient power (the insufficient current value calculated at the limiter 11A-8) caused by this is corrected by the function fc and also is added to the current value calculated at the function $f_5$, with this, the pumping light power of the pumping light source 8-2, as shown in the continuous line 21 of FIG. 15, by the same feedback coefficient "a" at "the state 1" and "the state 2", increases to compensate the insufficient power of the pumping light source 8-1.

As mentioned above, according to the present embodiment, when the plural pumping light sources 8-1 and 8-2 are used in the optical amplifier 1, even in the case where the pumping light power of the pumping light source 8-1 becomes insufficient and the pumping light power of the pumping light source 8-2 compensates for the insufficient power, there can be assumed no appearance of the state that the oscillation limit is different and a stable AGC can be carried out without the occurrence of the oscillation phenomenon.

And in this case, by the control section 10 (the feedback control section 11) being common for each of the pumping light sources 8-1 and 8-2, the feedback coefficient "a" is made variable according to the input light power, therefore, it is not necessary to provide an individual control section for each of the pumping light sources 8-1 and 8-2, and an AGC having low cost and high speed can be realized.

Figure 13:
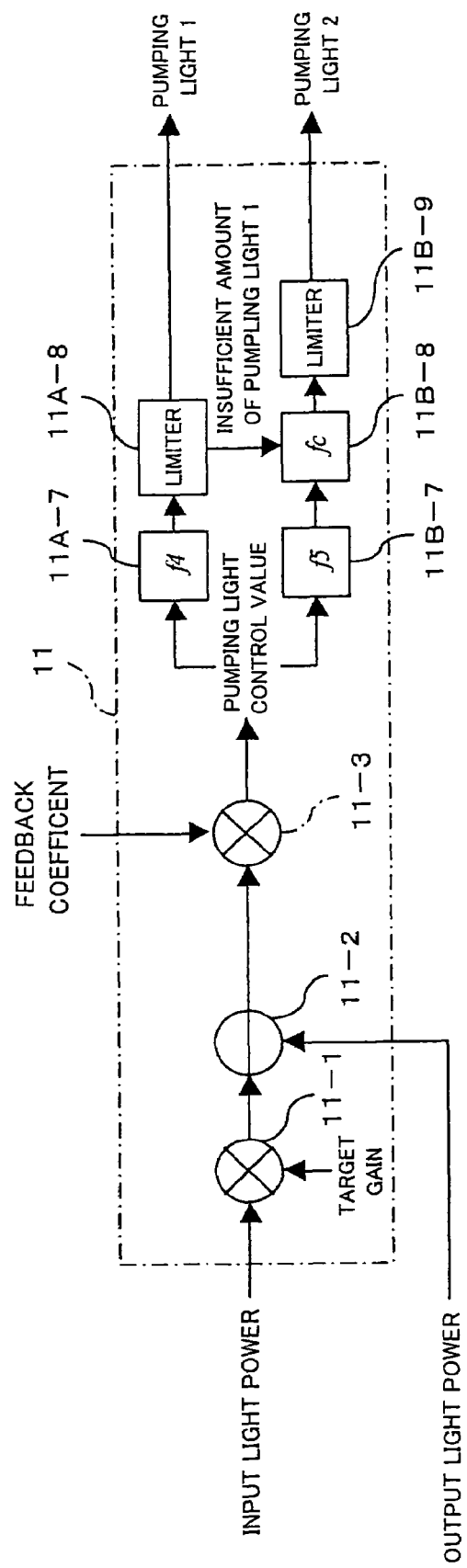

Here, the above-mentioned correction function that compensates the insufficient pumping light power, for example, as shown in FIG. 13, can be applied to the existing feedback control section 11 in which the feedback coefficient "a" is fixed (does not have the function $f_1$). Further, this correction function can be applied to the control section 10 having the above-mentioned feed forward control section 13 of the second embodiment.

Moreover, at the above-mentioned example, explanation has being given about the case, in which the pumping light power of the pumping light source 8-1 becomes insufficient and the pumping light power of the pumping light source 8-2 compensates the insufficient power. However, on the contrary, such is also the case with a case, in which the pumping light power of the pumping light source 8-2 becomes insufficient and the pumping light power of the pumping light source 8-1 compensate the insufficient power.

And at the above-mentioned example, the pumping light sources 8-1 and 8-2 are disposed at the input side and the output side of the EDF 4 by sandwiching the EDF 4, however, the pumping light sources 8-1 and 8-2 can be disposed only at either of the input side or the output side of the EDF 4. And the number of pumping light sources is not limited to two, and three or more of those can be disposed.

[D] Others

The present invention is not to be restricted by each of the embodiments and their modifications, and the substance of the present invention can change or modify the embodiments without departing from the scope and spirit of the present invention.

For example, at the above-mentioned examples, at the feedback control section 11, the case of the control using the difference or the difference and the integration value of the difference is explained, however, control using the combination of the above-mentioned values and a differential value of the difference can be carried out.

And at the above-mentioned examples, the structure, in which the feedback coefficient "a" at the feedback control section 11 is made variable according to the input light power of the optical amplifier 1, has been explained, however, for example, a structure, in which the feedback coefficient "a" is made variable according to both of the input light power and the output light power, can be used.

As mentioned above, according to the present invention, when a gain of an optical amplifier is controlled, according to at least one of input light power and output light power of the optical amplifier, the gain control amount is made variable, therefore, optical communication, which can carry out a follow-up control in response to the change in input power of signal light in high speed and also is stable, can be realized, without the occurrence of a oscillation phenomenon, the large size of the optical amplifier, and the increase in power consumption and heating. Therefore, the present invention has excellent usability in the optical communication field.

What is claimed is:

1. A controlling method for an optical amplifier having a first pumping light source and a second pumping light source, the method comprising:
   controlling said first pumping light source and said second pumping light source according to output light power of the optical amplifier, said second pumping light source being controlled at a first rate of increase; and
   controlling said second pumping light source so that the rate of increase of pumping light power from said second pumping light source becomes larger than the first rate of increase, upon expected pumping light power being unable to be obtained at said first pumping light source.

2. The method according to claim 1, further comprising:
   calculating a gain control amount based upon a difference from a target gain of the optical amplifier based on input light power and the output light power; and
   changing a coefficient for the difference according to only the output light power.

3. The method according to claim 1, further comprising:
   controlling a gain of an optical amplifier based on an input light power and said output light power of said optical amplifier; and
   making a gain control amount of said optical amplifier change, according to said output light power,
   wherein
   the controlling the gain of said optical amplifier comprises calculating a difference from a target gain of said optical amplifier based on said input light power and said output light power, and calculating said gain control amount based on said difference, and
   the making the gain control amount of said optical amplifier change comprises changing a coefficient for said difference according to said output light power.

4. The method according to claim 1, further comprising:
   controlling a gain of an optical amplifier based on an input light power and said output light power of said optical amplifier; and
   making a gain control amount of said optical amplifier change, according to said output light power,
   wherein
   the controlling the gain of said optical amplifier comprises calculating a difference from a target gain of said optical amplifier based on said input light power and said output light power, and calculating said gain control amount based on said difference and an integration value of said difference, and
   the making the gain control amount of said optical amplifier change comprises changing a coefficient for said difference according to said output light power.

5. The method according to claim 1, further comprising:
   controlling a gain of an optical amplifier based on an input light power and said output light power of said optical amplifier; and
   making a gain control amount of said optical amplifier change, according to said output light power,
   wherein
   the controlling the gain of said optical amplifier comprises calculating a difference from a target gain of said optical amplifier based on said input light power and said output light power, and calculating said gain control amount based on said difference and an integration value of said difference, and
   the making the gain control amount of said optical amplifier change comprises changing a coefficient for said difference and a coefficient for said integration value respectively, according to said output light power.

6. The method according to claim 1, further comprising:
   controlling said second pumping light source so that a composite rate of increase of pumping light power from both said first pumping light source and said second pumping light source is a constant value, if said expected pumping light power is not able to be obtained at said first pumping light source.

7. A method comprising:
   providing first and second pumping lights to an optical amplifier so that the optical amplifier amplifies a light in accordance with the provided first and second pumping lights;
   controlling power of the first and second pumping lights in accordance with a power level of the amplified light, said second pumping light being controlled at a first rate of increase; and
   upon power of the first pumping light not being able to obtain an expected power level, increasing power of the second pumping light at a rate of increase which becomes larger than the first rate of increase.

8. An apparatus comprising:
   means for providing first and second pumping lights to an optical amplifier so that the optical amplifier amplifies a light in accordance with the provided first and second pumping lights;
   means for controlling power of the first and second pumping lights in accordance with a power level of the amplified light, said second pumping light being controlled at a first rate of increase; and
   means, upon power of the first pumping light not being able to obtain an expected power level, for increasing power of the second pumping light at a rate of increase which becomes larger than the first rate of increase.

9. A controlling method for an optical amplifier having a first pumping light source and a second pumping light source, the method comprising:
   controlling said second pumping light source so that a rate of increase of pumping light power from said second pumping light source becomes larger than a previous rate of increase, upon expected pumping light power being not able to be obtained at said first pumping light source.

* * * * *